United States Patent
Hoffman et al.

(10) Patent No.: US 12,404,682 B2
(45) Date of Patent: Sep. 2, 2025

(54) RIGID POLYMERIC MODULAR FLOORING PLANK WITH CPVC AND METHOD OF MAKING SAME

(71) Applicant: Mannington Mills, Inc., Salem, NJ (US)

(72) Inventors: Zachary Hoffman, Kennesaw, GA (US); Brian Kuritz, Dallas, GA (US)

(73) Assignee: MANNINGTON MILLS, INC., Salem, NJ (US)

( * ) Notice: Subject to any disclaimer, the term of this patent is extended or adjusted under 35 U.S.C. 154(b) by 179 days.

(21) Appl. No.: 18/096,031

(22) Filed: Jan. 12, 2023

(65) Prior Publication Data

US 2023/0235574 A1 Jul. 27, 2023

Related U.S. Application Data

(60) Provisional application No. 63/302,141, filed on Jan. 24, 2022.

(51) Int. Cl.
*E04F 15/10* (2006.01)
*B32B 5/18* (2006.01)
(Continued)

(52) U.S. Cl.
CPC .............. *E04F 15/105* (2013.01); *B32B 5/18* (2013.01); *B32B 27/065* (2013.01); *B32B 27/08* (2013.01);
(Continued)

(58) Field of Classification Search
CPC ............ B32B 2255/10; B32B 2255/12; B32B 2255/26; B32B 2264/1023; B32B 2266/025; B32B 2272/00; B32B 2307/554; B32B 2419/00; B32B 2419/04; B32B 27/065; B32B 27/08; B32B 27/10;
(Continued)

(56) References Cited

U.S. PATENT DOCUMENTS 4,172,169 A 10/1979 Mawson et al.
4,187,131 A 2/1980 Shortway et al.
(Continued)

FOREIGN PATENT DOCUMENTS

CN 104371218 A * 2/2015
CN 106957501 A * 7/2017 ............. B32B 21/08

OTHER PUBLICATIONS

Translation of Cn 104371218A, Fang Q., Feb. 25, 2015. (Year: 2015).*
Translation of CN106957501A, Li Y., Jul. 18, 2017. (Year: 2017).*

*Primary Examiner* — Hai Vo
(74) *Attorney, Agent, or Firm* — Kilyk & Bowersox, P.L.L.C.

(57) ABSTRACT

A rigid polymeric modular flooring plank that contains chlorinated polyvinyl chloride (CPVC) in the core or base layer. The rigid polymeric modular flooring plank has at least a polymeric core or base layer, a decorative layer, and a wear layer located above the decorative layer. The CPVC can offset the negative effects from any plasticizer present in the core layer, and thus permits the core layer to include plasticized material such as from recycled or reclaimed sources including rework and scrap materials. Methods of making the planks are further described. A method to control dimensional stability of a polymeric flooring plank is further described.

13 Claims, 3 Drawing Sheets

| 12 |
|---|
| 7 |
| 5 |
| 9 |
| 3 |
| 14 |

22

(51) Int. Cl.
*B32B 27/06* (2006.01)
*B32B 27/08* (2006.01)
*B32B 27/20* (2006.01)
*B32B 27/22* (2006.01)
*B32B 27/30* (2006.01)
*C08L 27/06* (2006.01)
*E04F 15/18* (2006.01)

(52) U.S. Cl.
CPC ............. *B32B 27/20* (2013.01); *B32B 27/22* (2013.01); *B32B 27/304* (2013.01); *C08L 27/06* (2013.01); *E04F 15/107* (2013.01); *E04F 15/181* (2013.01); *B32B 2255/10* (2013.01); *B32B 2255/26* (2013.01); *B32B 2272/00* (2013.01); *B32B 2307/554* (2013.01); *B32B 2419/00* (2013.01); *C08L 2205/025* (2013.01); *C08L 2205/035* (2013.01); *C08L 2205/06* (2013.01); *C08L 2207/20* (2013.01)

(58) Field of Classification Search
CPC ....... B32B 27/20; B32B 27/22; B32B 27/304; B32B 27/308; B32B 27/32; B32B 27/36; B32B 29/005; B32B 5/18; C08K 2003/265; C08K 3/26; C08L 2205/025; C08L 2205/035; C08L 2205/06; C08L 2207/20; C08L 27/06; C08L 27/24; C08L 33/08; C08L 91/08; E04F 15/02038; E04F 15/105; E04F 15/107; E04F 15/181
See application file for complete search history.

(56) References Cited

U.S. PATENT DOCUMENTS

| | | |
|---|---|---|
| 4,313,866 A | 2/1982 | Renshaw |
| 4,423,178 A | 12/1983 | Renshaw |
| 4,426,820 A | 1/1984 | Terbrack et al. |
| 4,614,680 A | 9/1986 | Fry et al. |
| 5,112,671 A | 5/1992 | Diamond et al. |
| 5,380,794 A | 1/1995 | Schaefer et al. |
| 6,291,078 B1 | 9/2001 | Chen et al. |
| 6,490,836 B1 | 12/2002 | Moriau et al. |
| 6,986,934 B2 | 1/2006 | Chen et al. |
| 7,658,048 B2 | 2/2010 | Moriau et al. |
| 8,833,028 B2 | 9/2014 | Whispell et al. |
| 2005/0221056 A1* | 10/2005 | Schwonke ............... B32B 3/30 428/172 |
| 2006/0032175 A1 | 2/2006 | Chen et al. |
| 2007/0196624 A1 | 8/2007 | Chen et al. |
| 2009/0031662 A1 | 2/2009 | Chen et al. |
| 2009/0226662 A1 | 9/2009 | Dyczko-Riglin et al. |
| 2014/0058020 A1* | 2/2014 | Campbell .......... C08K 5/34924 544/221 |
| 2015/0175764 A1* | 6/2015 | Lensbouer ............. C08J 9/0023 442/221 |
| 2023/0007825 A1* | 1/2023 | Christiaens ............... B32B 5/18 |
| 2023/0064465 A1* | 3/2023 | Song ..................... E04F 15/107 |

\* cited by examiner

RIGID POLYMERIC MODULAR FLOORING PLANK WITH CPVC AND METHOD OF MAKING SAME

This application claims the benefit under 35 U.S.C. § 119(e) of prior U.S. Provisional Patent Application No. 63/302,141, filed Jan. 24, 2022, which is incorporated in its entirety by reference herein.

The present invention relates to a rigid polymeric modular flooring plank, a flooring system including the rigid polymeric modular flooring plank, and a method of making the rigid polymeric modular flooring plank. Further, the present invention relates to rigid polymeric flooring that can contain plasticizer(s), such as from plasticized rework or scrap material and yet retain suitable or required dimensional stability.

BACKGROUND OF THE INVENTION

The use of modular flooring planks to produce a floor is a common technique to quickly produce high-quality floors in both residential and commercial settings. These flooring planks are installed on an underlying floor. The flooring planks can be installed with mechanical connectors located on the edges of the flooring planks (e.g., tongue and groove connections) to create a free-floating flooring surface or can be immobilized on the subfloor with either a pressure sensitive adhesive attached to the under-side of the individual flooring planks or an adhesive composition applied to the underlying floor structure and/or to the plank.

There are various categories of polymeric flooring made and sold. One category is known as rigid polymeric planks that satisfy ASTM F3261. This ASTM standard, amongst other features, requires a dimensional stability feature. Generally, to make such a rigid polymeric flooring plank that is compliant with ASTM F3261, no plasticizer or very low amounts (e.g., below 0.1 wt % in the core layer) can be present in the core layer or base layer since plasticizer has a tendency to negatively affect dimensional stability to such a degree that the overall rigid polymeric plank does not satisfy the ASTM F3261 standard including the dimensional stability requirement.

This problem can prevent the use or significant use of incorporating recycled or reclaimed polymeric flooring materials as many, if not all, of such flooring contains some plasticizer in one or more layers of the polymeric flooring material (for instance, the wear layer if not other layers).

Thus, it would greatly benefit the flooring industry as well as environmental goals if recycled or reclaimed polymeric flooring (e.g., plasticized rework and/or scrap material) could be incorporated into flooring so as to make rigid polymeric flooring planks that still satisfy the ASTM F3261 standard and/or provide desired dimensional stability.

In view of the foregoing, improved polymeric flooring planks are needed that can have plasticizer present such as from recycled or reclaimed polymeric flooring (e.g., plasticized rework and/or scrap material) and still retain the desired dimensional stability as recited above.

SUMMARY OF THE PRESENT INVENTION

Accordingly, a feature of the present invention is to provide rigid polymeric flooring planks that include recycled or reclaimed polymeric flooring (e.g., plasticized rework and/or scrap material) and further satisfy ASTM F3261 (2020).

A further feature of the present invention is to provide rigid polymeric flooring planks that include recycled or reclaimed polymeric flooring (e.g., plasticized rework and/or scrap material) and maintain desired dimensional stability.

Another feature of the present invention is to provide rigid polymeric flooring planks that include recycled or reclaimed polymeric flooring (e.g., plasticized rework and/or scrap material), wherein the overall flooring plank has a plasticizer content and yet still satisfies ASTM F3261.

A further feature of the present invention is to provide a method to utilize plasticizer in a rigid polymeric flooring plank and still satisfy ASTM F3261.

A further feature of the present invention is to provide a method to utilize recycled or reclaimed polymeric flooring (e.g., plasticized rework and/or scrap material) in a rigid polymeric flooring plank and still satisfy ASTM F3261.

An additional feature of the present invention is to provide a method to offset the negative effects of plasticizer in a rigid polymeric flooring plank so as to maintain acceptable dimensional stability per ASTM F3261.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

One or more of the foregoing features have been accomplished in accordance with this invention by providing a rigid polymeric modular flooring plank that includes a) a core layer (or base layer) having a top surface and a bottom surface, b) an optional intermediate layer having a top surface and bottom surface and laminated to the top surface of the core layer, c) a decorative layer having a top surface and a bottom surface and laminated to the top surface of the intermediate layer if present or to the top surface of the core layer, and d) a wear layer laminated to the top surface of the decorative layer, wherein the core layer comprises at least one polyvinyl chloride (PVC) that comprises a chlorinated polyvinyl chloride (CPVC). The core layer preferably can contain at least one plasticized rework/scrap material. The core layer can contain or be formed from a blend that contains one or more of the following: at least one filler, at least one processing aid, at least one heat stabilizer, at least one fatty acid ester, at least one wax, at least one foaming or blowing agent, and/or at least one plasticized rework/scrap material.

The present invention further relates to a method to control dimensional stability of a polymeric flooring plank. The method includes the step of adding at least one chlorinated polyvinyl chloride to a polymeric formulation that is extruded to form a layer of the polymeric flooring plank.

The present invention also relates to a method to offset the negative effects from any plasticizer present in the core layer of a polymeric flooring plank. The method includes the step of adding an effective amount of CPVC in the blend that is used to form the core layer and then forming the core layer such as by extrusion. This permits the core layer to include plasticized material such as from recycled or reclaimed sources including rework and scrap materials.

The present invention, in addition, relates to forming a polymeric flooring plank. The method includes preparing a blend that includes at least one polyvinyl chloride (PVC) that includes a chlorinated polyvinyl chloride (CPVC) and then processing the blend into a core layer such as by extruding. The blend preferably can contain at least one plasticized rework/scrap material. The core layer can contain or be formed from a blend that contains one or more of the following: at least one filler, at least one processing aid, at least one heat stabilizer, at least one fatty acid ester, at least one wax, at least one foaming or blowing agent, and/or at least one plasticized rework/scrap material. The method further includes the step of attaching an optional intermediate layer having a top surface and bottom surface to the top surface of the core layer, and the step of attaching a decorative layer having a top surface and a bottom surface to the top surface of the intermediate layer if present or to the top surface of the core layer, and the step of attaching a wear layer to the top surface of the decorative layer. Additional method steps can be included as options.

It is to be understood that both the foregoing general description and the following detailed description are exemplary and explanatory only and are intended to provide a further explanation of the present invention, as claimed.

The accompanying drawings, which are incorporated in and constitute a part of this application, illustrate some of the features of the present invention and together with the description, serve to explain the principles of the present invention.

DETAILED DESCRIPTION OF THE PRESENT INVENTION

The present invention relates to polymeric flooring planks, such as planks that contain at least one core layer or base layer that is a polymer layer. The polymeric flooring planks can be a rigid polymeric flooring plank such as a rigid polymeric modular flooring plank.

The polymeric flooring planks can be a foamed polymer flooring plank, meaning that the core layer of the plank is a foamed material. As an option, the core layer is not a foamed material.

The polymeric flooring planks contain in the core layer or base layer a chlorinated polyvinyl chloride (CPVC). For purposes of the present invention, the term "core layer" is typically used herein, which alternatively can be considered or referred to a base layer.

The polymeric flooring plank can be a laminated product that has at least a polymeric core layer, a decorative layer located above the core layer, and a wear layer located above the decorative layer. As further described herein and shown in the Examples as well, the CPVC present in the core layer can offset the negative effects from any plasticizer present in the core layer, and thus permits the core layer to include plasticized material such as from recycled or reclaimed sources including rework and scrap materials.

In more detail, the polymeric flooring plank can comprise, consist essentially of, consist of, or include or is a) a core layer having a top surface and a bottom surface, b) an optional intermediate layer having a top surface and bottom surface and laminated to the top surface of the core layer, c) a decorative layer having a top surface and a bottom surface and laminated to the top surface of the intermediate layer if present or to the top surface of the core layer, and d) a wear layer laminated to the top surface of the decorative layer, wherein the core layer comprises at least one polyvinyl chloride (PVC). The PVC comprises, consists essentially of, consists of, or includes or is a chlorinated polyvinyl chloride (CPVC).

The polymeric flooring plank of the present invention can have a core layer that includes the CPVC and further includes one or more or all of the following: at least one thermoplastic compound or resin that is different from a CPVC, at least one PVC resin that is different from a CPVC, at least one filler, at least one processing aid, at least one stabilizer (e.g., heat stabilizer), at least one fatty acid ester, at least one wax, at least one foaming or blowing agent, or at least one plasticized rework/scrap material, or any combinations thereof.

As an example, the core layer includes CPVC, a PVC resin that is not a CPVC, and a plasticizer.

As an example, the core layer includes CPVC, a thermoplastic resin that is not a CPVC, and a plasticizer.

As an example, the core layer includes CPVC, a PVC resin that is not a CPVC, and plasticized rework/scrap material (RW).

Preferably, the polymeric flooring plank of the present invention includes a core layer that includes the CPVC and an amount of plasticizer. At least a portion of the plasticizer can be from at least one plasticized rework/scrap material.

A more preferred core layer includes CPVC, at least one plasticized rework/scrap material, at least one PVC resin that is not CPVC, and at least one filler.

The CPVC is commercially available, such as from Lubrizol and others.

Regarding the CPVC present in the core layer, CPVC is a PVC homopolymer that has been subjected to a chlorination reaction. Chlorine and PVC are reacted according to a basic free radical mechanism, which can be brought about by various approaches using thermal and/or UV energy. In PVC, a chlorine atom occupies 25 percent of the bonding sites on the carbon backbone, and the remaining sites are filled by hydrogen. CPVC differs from PVC in that over 25 percent, such as over 30 percent or over 35 percent such as approximately 40 percent of the bonding sites on the backbone are filled with chlorine atoms. The chlorine atoms surrounding the carbon backbone of CPVC are large atoms that protect the chain from attack. The chlorine content of base PVC can be over 57% or over 58% or over 60% such as from 58% to 74%. A preferred CPVC can contain 63% to 69% chlorine (based on molecular weight).

The amount of CPVC in the core layer can be at least 0.1 wt %, at least 0.5 wt %, at least 1 wt %, at least 5 wt %, at least 7.5 wt %, at least 10 wt % or at least 15 wt % based on total weight of the core layer. The amount of CPVC in the core layer can be from 0.1 wt % to 40 wt %, or from 0.1 wt % to 35 wt %, or from 0.1 wt % to 30 wt %, or from 0.1 wt % to 25 wt %, or from 0.1 wt % to 20 wt %, or from 0.1 wt % to 15 wt %, or from 0.1 wt % to 10 wt %, or from 0.1 wt % to 5 wt %, or from 0.1 wt % to 2 wt %, or from 0.5 wt % to 40 wt %, or from 0.75 wt % to 40 wt %, or from 1 wt % to 40 wt %, or from 5 wt % to 40 wt %, or from 7.5 wt % to 40 wt %, or from 10 wt % to 40 wt %, or from 15 wt % to 40 wt %, or from 20 wt % to 40 wt %, or from 25 wt % to 40 wt %, or from 5 wt % to 15 wt %, or from 5 wt % to 20 wt %, or from 10 wt % to 15 wt %, or from 10 wt % to 20 wt %, based on total weight of the core layer. For purposes of the present invention, the reference to total weight of the core layer is a reference to % by weight based on the formulation that is formed into the core layer, such as by extrusion.

The plasticizer present in the core layer can be present in various amounts. For instance, the plasticizer can be present in an amount of at least 0.1 wt % based on total weight of the core layer, or at least 0.2 wt % or at least 0.5 wt %, or at least 0.75 wt %, or at least 1 wt % or at least 1.25 wt % or at least 1.5 wt %, or at least 1.75 wt %, or at least 2 wt % or at least 2.25 wt % or at least 2.5 wt %, such as from 0.1 wt % to 3 wt %, or from 0.2 wt % to 3 wt %, or from 0.3 wt % to 3 wt %, or from 0.5 wt % to 3 wt %, or from 0.75 wt % to 3 wt %, or from 1 wt % to 3 wt %, or from 1.25 wt % to 3 wt %, or from 1.5 wt % to 3 wt %, or from 0.1 wt % to 2.9 wt %, or from 0.1 wt % to 2.75 wt %, or from 0.1 wt % to 2.5 wt %, or from 0.1 wt % to 2 wt %, or from 1 wt % to 3 wt %, or from 1 wt % to 2.5 wt %.

The CPVC and plasticizer in the core layer can be present various weight ratios. For instance, the weight ratio of CPVC:plasticizer in the core layer can be at least 5 or at least 5.5 or at least 6, or at least 7, or at least 8, or at least 9, or at least 10, such as from 5 to 15, or from 6 to 12, or from 6 to 12, or from 7 to 12, or from 8 to 12, or from 5 to 12, or from 5.5 to 12, or from 5.5 to 10, or from 5.5 to 8.

The source of the plasticizer can be virgin plasticizer and/or used or recycled or reclaimed plasticizer. The virgin plasticizer is commercially available. Preferably, the plasticizer is used and can be present in plasticized rework and/or scrap material.

In making polymeric flooring planks, commonly, the planks are formed (e.g., extruded) as large pieces, such as 4 ft by 8 ft or other large dimensions and then upon the various layers of the plank being put together (e.g., laminated), the large pieces are cut down into final plank size. Through this processing and/or other processing and as a result of rejected material (non-first quality material), scraps and/or rework material is created or obtained. In the past, many manufacturers would discard this material as waste. Further, when flooring is replaced in commercial and/or residential uses, used polymeric flooring is recovered. Again, in the past, this flooring was simply discarded as waste. With the present invention, this rework material, reclaimed material, and/or scrap material can be recycled by reducing this material to particulate form and then including the material in a formulation for the core material and wherein the thermoplastic components of this material is melted so as to form a liquid formulation that is extruded to form the core layer.

For purposes of the present invention, the reference to rework/scrap material includes any combination of the rework material, reclaimed material, scrap material and the like. The rework/scrap material can be sourced from flooring (e.g., flooring planks) or portions thereof. In addition or alternatively, the rework/scrap material can be sourced from other rework/scrap material. In addition or alternatively, the rework/scrap material can be from or include flooring accessories, other adjacent streams from building and construction, roofing and/or roofing membranes, geomembranes, signage or advertising panels, and/or other adjacent markets and products.

The plasticized rework/scrap material means that the material has a plasticizer content. The plasticizer content can be any of the plasticizer amounts (and/or ranges) provided herein and those amounts are incorporated by reference here. The amounts are based on the total weight of the plasticized rework/scrap material.

The plasticizer may be any plasticizer, including any conventional plasticizer, that can be used in vinyl resins. Examples include, but are not limited to, processing oils, polyesters, polyethers, polyether esters, and/or mixtures thereof. The plasticizer can be in the form of an oily liquid that softens vinyl and adds flexibility to a composition containing a vinyl resin. The plasticizer can be dioctyl terephthalate (bis(2-ethylhexyl) benzene-1,4-dicarboxylate (DOTP) and/or 1,2-Cyclohexane dicarboxylic acid diisononyl ester (DINCH). Other examples include, but are not limited to, bio-based plasticizers (e.g., soybean oil). Commercial sources include Vikoflex/Vikoplast, Drapex Alpha 200, Cargill Biovero, Valtris G-2000 plasticizers. As a further example, the plasticizer may be a phthalic diester or a mixture of phthalic diesters, such as a mixture of diisononyl phthalate (DINP) and butyl benzyl phthalate. A suitable plasticizer containing about 10 wt % diisononyl phthalate and about 90 wt % butyl benzyl phthalate, for example, is provided by Ferro Corp. designated with a product code of Santicizer-160 (S-160). Other examples of plasticizers include, but are not limited to, di(2-ethylhexyl) phthalate (DOP), diisooctyl phthalate (DIOP), ditridecyl phthalate (DTDP), dihexyl phthalate (DHP) and diiosdectyl phthalate (DIDP), and the like. The selection criteria of plasticizers can be to enhance flexibility, resiliency, and/or melt flow.

The core layer that contains at least one plasticized rework/scrap material (RW) and the CPVC can be present at various weight ratios in the core layer. For instance, the RW and the CPVC can be present in an amount so as to have a CPVC/RW weight ratio of at least 0.2, or at least 0.3 or from 0.2 to 1 or higher, or from 0.2 to 0.9, or from 0.2 to 0.8, or from 0.2 to 0.7, or from 0.2 to 0.6, or from 0.3 to 1, or from 0.4 to 1, or from 0.5 to 1.

Regarding the thermoplastic resin or thermoplastic compound (other than CPVC), the thermoplastic resin or polymer can include, but is not limited to, vinyl containing thermoplastics such as polyvinyl chloride, polyvinyl acetate, polyvinyl alcohol, and other vinyl and vinylidene resins and copolymers thereof; polyethylenes such as low density polyethylenes and high density polyethylenes and copolymers thereof; styrenes such as ABS, SAN, and polystyrenes and copolymers thereof, polypropylene and copolymers thereof; saturated and unsaturated polyesters; acrylics; polyamides such as nylon containing types; engineering plastics such as acetyl, polycarbonate, polyimide, polysulfone, and polyphenylene oxide and sulfide resins and the like. One or more conductive polymers can be used to form the flooring panel body, which has applications in conductive flooring and the like. The thermoplastic polymers set forth in Kirk Othmer (3rd Edition, 1981) at pp. 328 to 848 of Vol. 18 and pp. 385-498 of Vol. 16, (incorporated in its entirety by reference herein) can also be used as long as the resulting flooring panel body has sufficient strength for its intended purpose.

The thermoplastic material can be polyvinyl chloride, can be a suspension grade, or mass polymerization grade homopolymer resin having a preferred molecular weight as reflected by an inherent viscosity of from about 0.88 to about 1.0 inherent viscosity. In general, a higher molecular weight polymer is preferred from the standpoint of processing stability and preferably the molecular weight distribution and particle size distribution are narrow in order to provide a good balance between processability and properties. Also, high porosity and uniform porosity of the resin particles are preferred to optimize compounding and processing aspects, including the fast and uniform absorption of any stabilizer that is present as well as other ingredients during compounding. A thermoplastic material used to form the base layer portion can be a rigid PVC powder compound that has good impact strength, ease of processing, high extrusion rate, good surface properties, excellent dimensional stability, and indentation resistance.

The polymeric resin can include a vinyl chloride homopolymer and a vinyl copolymer, such as a vinyl chloride-vinyl acetate copolymer, wherein the vinyl chloride homopolymer can be present in the composition in an amount from about 1 wt % to greater than 50% by weight of the combined amount of vinyl chloride homopolymer and a vinyl copolymer, such as vinyl chloride-vinyl acetate copolymer (e.g., from about 1 wt % to about 20 wt %, from about 20 wt % to about 40 wt %, from about 40 wt % to about 60 wt %, about 60 wt % or greater, about 65 wt % or greater, about 70 wt % or greater; or from about 75 wt % to about 99 wt %). As a non-limiting example, the amount of vinyl chloride homopolymer in the virgin polymer can be from about 80 wt % to about 99 wt % based on the weight of the combined amount of vinyl chloride homopolymer and vinyl chloride-vinyl acetate copolymer, or can be from about 70%-99% (or more) by weight of the combined amount of vinyl chloride homopolymer and vinyl chloride-vinyl acetate copolymer, or can be from about 80% to 90% by weight of the combined amount of vinyl chloride homopolymer and vinyl chloride-vinyl acetate copolymer. The vinyl chloride copolymer and homopolymer can have any K-value or molecular weight. Additional properties of the vinyl chloride homopolymer and a vinyl copolymer are described, for example, in U.S. Patent Application Publication No. 2009/0226662, which is incorporated in its entirety by reference herein.

The thermoplastic resin (such as a PVC resin) that is not a CPVC can be present in an amount of from 0 wt % to 25 wt % or more, or from 0.1 wt % to 20 wt %, based on the total weight of the core layer. Examples of amounts can be from 1 wt % to 25 wt %, from 5 wt % to 25 wt %, from 10 wt % to 25 wt %, from 15 wt % to 25 wt %, from 0.5 wt % to 25 wt %, from 1 wt % to 20 wt %, from 1 wt % to 15 wt %, from 1 wt % to 10 wt %, from 0.5 wt % to 5 wt %, from 1 wt % to 5 wt %, based on the total weight of the core layer. More than one thermoplastic resin can be present in the core layer, such as two or three or more.

Regarding the at least one filler, the filler can be any filler, including any conventional filler. The filler can be a natural filler or a synthetic filler. The filler can be in the form of particles, short fibers, flakes, and other discrete forms. Inorganic filler can be used. Examples of inorganic filler can include, but are not limited to, hydrated alumina, magnesium carbonate, calcium sulfate, silica, precipitated silica, fumed silica, fly ash, cement dust, glass, clay, talc, calcium carbonate, barium sulfate, silicates, aluminum trihydrate, talc, clay, kaolin, wollastonite, gypsum, solid or hollow glass microspheres, and the like. Inorganic fillers can be, for example, mineral fillers. The filler also can be a non-mineral or organic filler such as carbon black, wood flour, cellulose-derived materials, ground rice hulls, solid or hollow temperature resistant polymer microspheres or microbeads (e.g., phenolic microspheres), and the like. The filler can be or include one or more bio fillers. A bio filler can include one or more plant-based fillers (e.g., cellulose, hemicellulosic, lignin based, lignocellulose, starch based, and/or agricultural waste streams (e.g., olive stone powder, avocado core, apricot stone, peach stone, walnut shells, almond shells, pistachio shells, and the like. Commercial sources include Schilling Ltd. dba BioPowder. Examples of some fibrous bio-fillers include hemp fiber, hemp hurd, wheat fiber, engineered and/or reclaimed cellulose fibers. An example of a commercial source is J. Rettenmaier Arbocell products.

The inorganic and organic fillers can be used in combinations in the core layers, or either type can be used as the sole type of filler in the core layers.

The filler can be present in an amount of from 0 wt % to 55 wt % or more, or from 0 wt % to 52 wt %, based on the total weight of the core layer. Examples of amounts can be from 1 wt % to 55 wt %, from 10 wt % to 55 wt %, from 15 wt % to 55 wt %, from 20 wt % to 55 wt %, from 25 wt % to 55 wt %, from 30 wt % to 55 wt %, from 35 wt % to 55 wt %, from 5 wt % to 50 wt %, from 5 wt % to 45 wt %, from 5 wt % to 40 wt %, from 5 wt % to 35 wt %, from 5 wt % to 30 wt %, based on the total weight of the core layer. More than one filler can be present in the core layer, such as two fillers or three fillers or more. For examples, the filler can be carbon black alone or calcium carbonate alone or be both carbon black and calcium carbonate.

At least one processing aid can be present in the core layer. The processing aid can be an acrylic based processing aid, such as a high molecular weight acrylic-based processing aid (e.g., over 500,000 Daltons for an average molecular weight or over 1 million Daltons for an average molecular weight). Commercial sources can include DOW Paraloid Surecel K467, DOW Paraloid Surecel K488, and other DOW Paraloid and Surecel products, Arkema P580, Donglin DL-698, Donglin DL-658, Kaneka PA-92P and other Kaneka Kane Ace products, Galata Blendex products, Arkema Plastistrength. A processing aid can be or include MMA (methyl methacrylate), SAN (styrene acrylonitrile), MMA-SAN (methyl methacrylate-styrene acrylonitrile), and/or ASA (acrylonitrile styrene acrylate) and the like.

The processing aid(s) can be present in an amount of from 0 wt % to 10 wt %, such as from 0.1 wt % to 10 wt %, or from 1 wt % to 10 wt %, or from 3 wt % to 10 wt %, or from 5 wt % to 8 wt %, based on the total weight of the core layer.

At least one stabilizer can be present in the core layer. A stabilizer typically provides heat stability and/or UV light stability to the polymer formulation. The stabilizer according to the present invention can be selected for effectiveness with the particular polymer used and may be a calcium-zinc stabilizer. A calcium-zinc stabilizer containing about 5.5 wt % or more zinc may be used, such as about 6.0 wt % to about 10.0 wt % zinc. Specific non-limiting examples of zinc-calcium stabilizers are supplied by Chemson, Inc. under the product codes of PTP113 (5.8% zinc, 10.5% calcium by weight). Other examples of stabilizers include, but are not limited to, barium-cadmium stabilizers, barium-zinc stabilizers, organotin stabilizers, epoxidized soybean oils, and the like.

The heat stabilizer can be a CaZn heat stabilizer. The heat stabilizer can be present in an amount of from 0 wt % to 3 wt %, such as from 0.1 wt % to 3 wt %, or from 0.5 wt % to 3 wt %, or from 1 wt % to 3 wt %, based on the total weight of the core layer.

At least one fatty acid ester can be present in the core layer. Examples of the fatty acid ester include Loxiol G60 or an alternative such as EGDS (ethylene glycol distearate). A further commercial example is Loxiol P1141. The fatty acid ester can be present in an amount of from 0 wt % to 3 wt %, such as from 0.1 wt % to 3 wt %, or from 0.5 wt % to 3 wt %, or from 1 wt % to 3 wt %, based on the total weight of the core layer.

At least one wax can be present in the core layer. Examples of the wax include polymeric wax(es), such as a polyethylene wax and/or oxidized polyethylene wax. The wax can be present in an amount of from 0 wt % to 3 wt %, such as from 0.1 wt % to 3 wt %, or from 0.1 wt % to 2 wt %, or from 0.5 wt % to 3 wt %, or from 1 wt % to 2 wt %, based on the total weight of the core layer.

At least one foaming agent or blowing agent can be present in the core layer. Examples of the foaming agent or blowing agent include, but are not limited to, FICEL 01SBH37 from Hughes Polymer Additives. Foaming agents can be liquids or powders. The foaming agent can be an exothermic, endothermic, or combination endo/exothermic blowing agent based on azodicarbonamide, sodium or potassium bicarbonate, benzensulfonyl hydrazide, urea based, and others. Commercial sources include Bergen International Foamazol products, Avient liquids (e.g., FA product line), Celogen foaming agents and foaming agents manufactured by Duoge, Jiangxi Yubo, Jiangxi Yuhuan, and/or Quanzhou Haitai Chemical Co.

The foaming agent or blowing agent can be present in an amount of from 0 wt % to 1 wt %, such as from 0.1 wt % to 0.5 wt %, or from 0.1 wt % to 0.3 wt %, based on the total weight of the core layer.

At least one stabilizer can be present in the core layer. Examples of the stabilizer include, but are not limited to, a mixed metal stabilizer such as, but not limited to, CaZn, MgZn, or BaZn. Other examples include single metal stabilizers that can include Ca based, or tin based stabilizers. The stabilizer can be an organic based stabilizer. A commercial example of a stabilizer is AM Plastistab 5032.

A co-stabilizer can be used, such as, but not limited to, Kisuma Alchemizer 1 which is an acid scavenger and can be a mineral based material such as hydrotalcite. Other co-stabilizers include zeolites, beta diketones, and/or phosphates (oligomeric and polymeric).

The stabilizer can be present in an amount of from 0 wt % to 3 wt %, such as from 0.1 wt % to 3 wt %, or from 0.1 wt % to 2 wt %, or from 0.5 wt % to 3 wt %, or from 1 wt % to 2 wt %, based on the total weight of the core layer.

As an option, one or more coupling agents can be present in a polymer formulation, such as a maleic anhydride. The coupling agent(s) is especially preferred when 1% or less by weight of vinyl copolymer is present. Generally, the coupling agent can be present in an amount sufficient to permit sufficient coupling of the homopolymer and/or other components. Amounts can be, for instance, from about 5% by weight or less (e.g., about 0.1 wt % to 4 wt %) based on the weight of a homopolymer and vinyl copolymer present. Other amounts can be used.

As an option, the polymeric flooring plank can further include a top coat on the top surface of the wear layer. The top coat can be polymeric top coating, such as, but not limited to, a cured polymeric coating (e.g., a UV cured urethane top coating). The top coat can have a thickness of from about 0.1 mm to about 0.3 mm. The thickness can be considered an average overall thickness.

As an option, the polymeric flooring plank can further include an underlayer, such as a foam layer, on the bottom surface of the core layer, or underneath the core layer.

As an option, the polymeric flooring plank can further include both a top coat on the top surface of the wear layer and an underlayer, such as a foam layer, on the bottom surface of the core layer.

The core layer can be, consists of, consist essentially of, or comprise one or more layers to form the core layer. When the core layer has more than one layer, each layer can be the same or different from each other with respect to material, thickness, and physical properties, such as, but not limited to, stiffness (as defined herein).

The core layer can have a thickness of from about 4 mm to about 15 mm or more, or from about 5 mm to 12 mm, or from 5 mm to 8 mm, or 6 mm to 10 mm or other values. The thickness can be considered an average overall thickness.

The optional intermediate layer can be one or more PVC layers such as plasticized PVC layers or flexible PVC layers. The amount of plasticizer in the intermediate layer can be from 0.1 wt % to 30 wt % (e.g., 0.5 wt % to 30 wt %, 1 wt % to 30 wt %, 5 wt % to 30 wt %, 10 wt % to 30 wt %, 15 wt % to 30 wt %), based on the total weight of the intermediate layer. A specific example of an intermediate layer is DOTP plasticized PVC. The plasticizers described earlier can be utilized here. DOTP is also known as bis(2-ethylhexyl) terephthalate (which can be >98 wt % DOTP) and can optionally have trace amounts (<2 wt %) of 2-ethylhexyl methyl terephthalate. Commercial examples include Eastman 168 or BASF Palatinol DOTP.

The optional intermediate layer can include PVC (as described herein) and optionally a filler (e.g., calcium carbonate), a heat stabilizer, a processing aid, a co-plasticizer (e.g., epoxidized soy or soybean oil), or a dispersant (e.g., BYK P4100) or any combinations thereof.

The optional intermediate layer can include one or more fillers (e.g., mineral based fillers, such as talc, kaolin clay, wollastonite and/or impact modifiers.

The intermediate layer can have a thickness of from about 0.1 mm to about 1 mm, or from about 0.2 mm to 0.9 mm, or from 0.3 mm to 0.8 mm, or 0.5 mm to 0.8 mm or other values. The thickness can be considered an average overall thickness.

The decorative layer is also referred to or considered the print layer or décor layer, and can also be known as a printed visual. The decorative layer can be a rigid opaque printed decorative layer. The decorative layer can comprise a gravure print, a digital print, a flexo print, a transfer print, a pad print, a stamping print, a decorative painting, or any combination thereof. Any conventional printing means can be used to produce this layer. The printed visual on the decorative layer can have any pattern, such as, but not limited to, simulated natural surfaces, such as natural wood, stone, tile, marble, granite, brick appearance, or the like. The decorative layer can have a thickness of 0.5 mm or less, such as 0.02 mm to 0.1 mm and the like.

As a non-limiting example, the decorative layer can comprise a design layer that optionally can have chemically or mechanically embossed textures in register so as to simulate such features found in natural surfaces (e.g., grout lines, wood grain, wood knots, ceramic surface textures, and the like). Any ink composition can be used, such as those that contain an acrylic resin, water, alcohol, and one or more pigments. A design can be done in register using multiple station rotogravure printing.

The decorative layer can include a substrate, wherein the substrate can comprise one or more polymer (e.g., plastic) films and/or papers (e.g., cellulose). These films may be selected from thermoplastic films, such as acrylic, polyolefin, ionomer, and polyester. Alternatively, a cellulose base paper can be used as the substrate for the decorative layer. Examples of cellulose core layers and methods of incorporating them into laminated or surface coverings are described in U.S. Pat. No. 6,986,934, which is incorporated by reference in its entirety herein. Other types of film or materials for the décor layer are possible.

The decorative layer can be, for example, a PVC film or an aminoplast resin impregnated printed paper. The decorative layer can be, for example, a printed design, such as to simulate various wood grains. The printed design can be any design that is capable of being printed onto the decorative layer. Generally, the decorative layer can be prepared by rotogravure printing techniques or other printing means such as digital printing. Once the paper has the design printed on it, the paper can then be impregnated with an aminoplast resin or mixtures thereof. The aminoplast resin can be, for example, a blend of a urea formaldehyde and a melamine formaldehyde.

As an option, the decorative layer of the flooring panel body can comprise, consist of, consist essentially of, or have, an embossed decorative design.

Once the decorative layer is formed, it can be placed onto the top surface of the core layer. Simulated grout lines are then formed to delineate individual tiles in the decorative layer, thereby forming a single plank having an appearance of multiple tiles.

The polymeric flooring plank of the present invention can further comprise, consist of, consist essentially of, include, or have, an underlay. The underlay can be attached or adhered to the bottom surface of the core layer.

The underlay can comprise, consist of, consist essentially of, include, or have, a foam layer, a cushioning layer, a thermal insulating layer, a sound insulating layer, a moisture barrier layer, an impact barrier layer, an electrostatic barrier layer, a pest resistant layer, a mold resistant layer, an odor resistant layer, a rigidity layer, a structural reinforcement layer, a magnetic layer, a floating floor engagement layer, a radiant heat engagement layer, a utility access engagement layer, or any combination thereof.

The underlay can have a thickness of from about 0.1 mm to about 1 mm, or from about 0.2 mm to 0.9 mm, or from 0.3 mm to 0.8 mm, or 0.5 mm to 0.8 mm or other values. The thickness can be considered an average overall thickness.

A specific example of an underlay is a cross-linked polyethylene foam layer that can be attached to the bottom surface of the core layer by bonding with an adhesive or glue, such as, but not limited to, a hot melt pressure sensitive adhesive or polyurethane glue that can be roll coated onto the bottom surface of the core layer.

The underlay can be positioned between the core layer on the side that faces the sub-flooring structure, i.e., the bottom layer of the core layer. For example, the bottom surface of the core layer can include a body proper and an underlayer between the body proper.

As a further option, the polymeric flooring plank of the present invention can further comprise, consist of, consist essentially of, or have, a first adhesive layer, and, optionally, a second adhesive layer. The first and/or second adhesive layer can be located on the bottom side of the core layer, where the underlay can be located between the first adhesive layer and the bottom side of the core layer. Alternatively, the underlay can be located between the first adhesive layer and the second adhesive layer.

Any suitable adhesive or combination of adhesives can be used in the first and second adhesive layers.

Other ingredients can be present in the core layer and/or any one or more other layers, such as one or more flame retardants, UV stabilizers, antistatic agents, wear resistant particles, antimicrobial additives, pigments, processing aids, dispersion additives, lubricants, colorants, modifying resins, cross-linking agents, antioxidants, foaming agents, tackifiers, and/or other conventional organic or inorganic additives commonly used in polymers.

Figure 1:
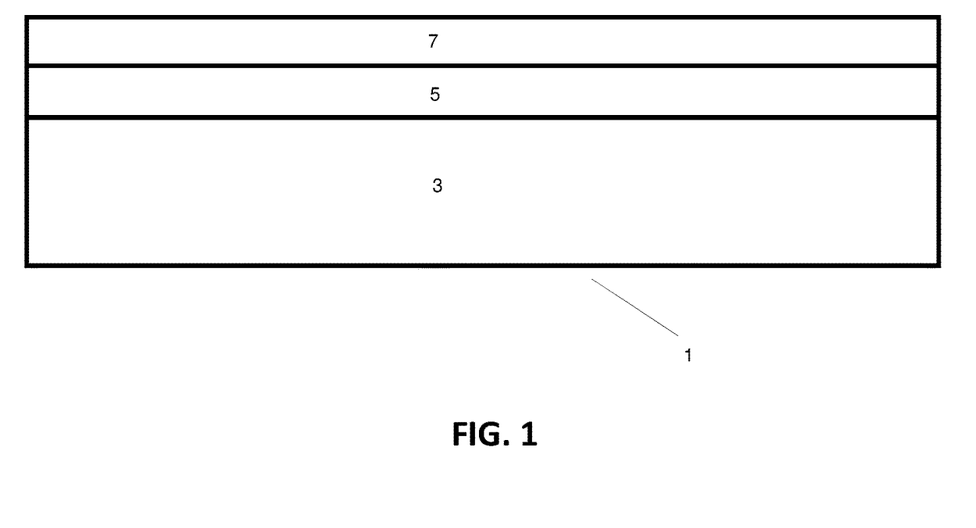
FIG. 1 is a side view (not to scale) of one example of the rigid polymeric modular flooring plank according to the present invention showing the layers of the flooring plank.

FIG. 1 is a side view (not to scale) of one example of the rigid polymeric modular flooring plank 1 according to the present invention showing the layers of the flooring plank. Layer 3 is the core layer as described herein. Layer 5 is the decorative layer adhered or attached to the core layer 3. Layer 7 is the wear layer that is adhered or attached to the decorative layer 5.

Figure 2:
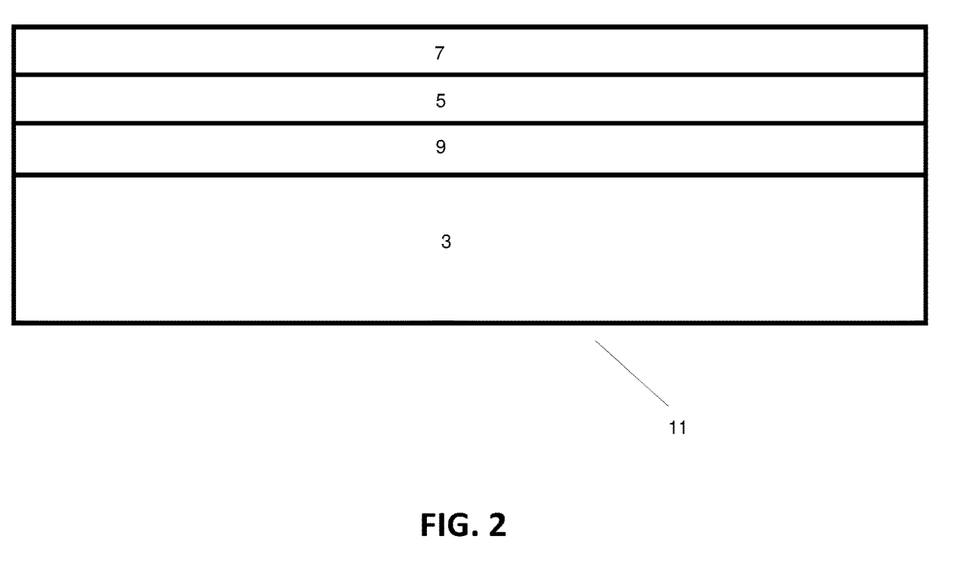
FIG. 2 is a side view (not to scale) of another example of the rigid polymeric modular flooring plank according to the present invention showing the layers of the flooring plank.

FIG. 2 is a side view (not to scale) of another example of the rigid polymeric modular flooring plank 11 according to the present invention showing the layers of the flooring plank. Layer 3 is the core layer as described herein. Layer 9 is the intermediate layer (as described herein) that is adhered to or attached to the core layer 3. Layer 5 is the decorative layer (as described herein) adhered or attached to the intermediate layer 9. Layer 7 is the wear layer (as described herein) that is adhered or attached to the decorative layer 5.

Figure 3:
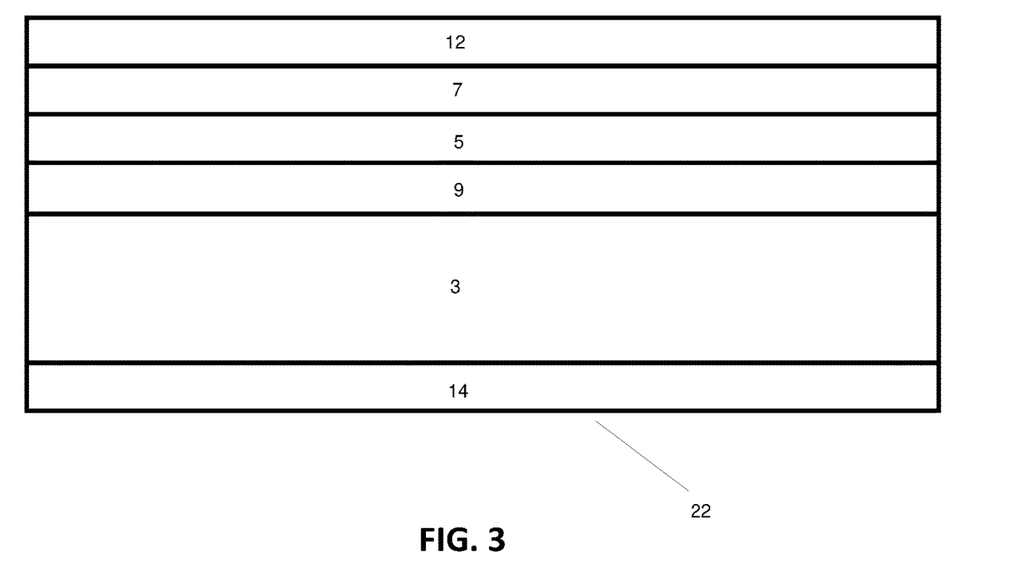
FIG. 3 is a side view (not to scale) of a further example of the rigid polymeric modular flooring plank according to the present invention showing the layers of the flooring plank.

FIG. 3 is a side view (not to scale) of a further example of the rigid polymeric modular flooring plank 22 according to the present invention showing the layers of the flooring plank. Layer 3 is the core layer as described herein. Layer 9 is the intermediate layer (as described herein) that is adhered to or attached to the core layer 3. Layer 5 is the decorative layer (as described herein) adhered or attached to the intermediate layer 9. Layer 7 is the wear layer (as described herein) that is adhered or attached to the decorative layer 5. Layer 12 is the top coat (as described herein) that is adhered or attached to the wear layer 7. Layer 14 is the underlayer (as described herein) (e.g., foam layer) that is adhered or attached to core layer 3.

The polymeric flooring plank of the present invention can be, and preferably is ASTM F3261 (2020) compliant.

Most, if not all, of the components used to form the core layer and/or the intermediate layer, and/or the wear layer can be in powder, liquid, cubed, pelletized form and/or any other extrudable form. Also, the thermoplastic polymer and/or other one or more of the other components used to form the core layer and/or the intermediate layer, and/or the wear layer can be can be virgin, recycled, or a mixture of both. Furthermore, the formulation used to make a layer such as the core layer can have a blowing agent(s) incorporated therein or a mechanically injected gas during the extrusion process to make a cellular foam structure core or other layer.

The base layer portion formulation may be in any physical form suitable for storage and/or for use to form a base layer. For example, all of the ingredients except the plasticizer are typically solid ingredients and are typically in powder or pellet form. Accordingly, these ingredients can be mixed in any order and by any method known in the art for combining powder, and the plasticizer, which is typically a liquid, may be blended into the resulting mixture. The base layer formulation may be premixed and stored for a period of time prior to use, or may be mixed just before, or even during, a process for manufacturing the base layer. The components, additional layers and/or methods of U.S. Pat. Nos. 5,112,671; 4,614,680; 4,187,131; 4,172,169, 4,423,178; 4,313,866; and/or 5,380,794 can be used in the present application and these patents are incorporated in their entirety be reference herein.

In the present invention, one or more layers can contain wear resistant particles, such as a wear layer and/or wear top coat layer (e.g., protective layer). One example is at least one layer containing aluminum oxide. The aluminum oxide used in the present invention is also known as alumina or $Al_2O_3$. The aluminum oxide can be fused or calcined. The refractive index can be from about 1.4 to about 1.7.

A sufficient amount of the aluminum oxide and/or other wear resistant particles can be present in at least one layer of the surface covering to provide improved wear and/or stain resistance to a surface covering as compared to no aluminum oxide being present. From about 2 g/m² to about 50 g/m² or more, or from about 4 g/m² to about 20 g/m² of alumina, for example, can be present in at least one layer of the surface covering. Alternatively, from about 1% by weight to about 40% or more by weight of alumina can be present in at least one layer of the surface covering. Also, while any source of aluminum oxide can be used, the aluminum oxide can have the following characteristics: fused or calcined and having a hardness of from about 6 to about 9 on a Moh's scale, and most preferably about 9 on a Moh's scale. The particle size of the aluminum oxide can be, for example, from about 10 microns to about to about 70 microns, or from about 20 microns to about 50 microns. Sources of aluminum oxide are Washington Mills, N. Grafton, Mass.; ALCOA Industrial Chemicals, Bauxite, Ark.; Composition Materials, Fairfield, Conn.; Micro Abrasives, Westfield, Mass.; and Alu Chem, Inc., Birmingham, Ala. The aluminum oxide, which can be part of at least one layer of the surface covering, can be added in any manner known to those skilled in the art for adding particles to a layer. The aluminum oxide can be mixed into a wet coating or scattered on top of a wet coating. The aluminum oxide can be, for example, applied by a pellet dispenser, which applies or sprinkles aluminum oxide on top of a layer which is still "wet" or uncured. By the layer being "wet" or uncured, the aluminum oxide "sticks" or adheres to the "wet" layer and at least a portion of the aluminum oxide "sinks" into the layer and thus is not exposed to the environment. Instead of alumina, other metal oxides or ceramics can be used.

The mixing of alumina (and/or other hard particles) with a formulation that forms the wet coating generally requires constant mixing of the coating with alumina to preferably keep the alumina suspended in the coating. Surface treatments of the alumina and the use of other anti-settling agents help in minimizing the settling. Once the aluminum oxide is applied to the layer which is "wet" or uncured, the surface covering containing this layer is cured by means known to those skilled in the art, such as radiation curing, UV, electron beam, thermal and/or moisture curing, and the like. The aluminum oxide can be present in the outermost layer of a surface covering which is the layer subjected to the environment including foot traffic and other objects coming in contact with the surface covering. Generally, this outermost layer is known as the top coat layer or wear layer top coat or protective layer. This wear layer top coat can be a polymeric layer, such as a thermoset or thermoplastic, and can be made of urethane or acrylic, melamine, polyvinyl-chloride, or polyolefins, and the like.

Acrylics, alkyd resins, melamines, conventional clear coats, polyvinyl chloride, polycarbonates, kevlar, epoxy coatings, polyester, polyester acrylates, vinyl-ether-functionalized urethane, epoxysiloxanes, epoxysilicones, multi-functional amine terminated acrylates, acrylate melamines, polyethylene and diene copolymers, and the like, can be used in place of the urethane-based acrylates described above. Basically, the wear resistance of any surface or coating can be improved by the incorporation of hard particles such as fused alumina.

For instance, the laminate forms of the present planks can be coated, for example, with about 0.3 to about 2.5 mil of acrylated urethane-based UV-curable top coat or other top coat formulations. On the wet coat in a typical application, about 5-15 g/m$^2$ of fused alumina with average particle size in the range of about 25-40 microns can be applied to this top coat by a modified Christy Machine or by a Schilling scattering machine and then the top coat can be cured by UV-light (or other radiation curable source) employing either a direct or differential cure mechanism. Depending on the product specification, the amount of alumina and the thickness of the coating can be varied. Also, for example, from about 15 to about 35 g/m$^2$ of alumina (in a layer) in the particle size range of about 50 to about 150 microns could be used in the production of non-slip coverings. Carborundum, quartz, silica (sand), glass, glass beads, glass spheres (hollow and/or filled), plastic grits, silicon carbide, diamond dust (glass), hard plastics, reinforced polymers and organics, etc., may be substituted for all or part of the alumina. The techniques and formulations described in U.S. Pat. No. 6,291,078 can be used herein and this patent is incorporated in its entirety by reference.

The overlay or wear layer can also be an overlay paper. An overlay paper that can be used, includes, for example, an overlay paper, which upon being affixed onto the print layer, is clear in appearance. Types of overlap paper or other wear layers that can be used, include those as described in U.S. Patent Application Publication Nos. 2006/0032175; 2007/0196624; and 2009/0031662, which are incorporated in their entireties herein by reference.

A present plank also can comprise, for example, the same plank described above but, in lieu of a top layer on top of the plank, a design is printed directly on the top surface of the plank using any number of printing techniques such as gravure printing, transfer printing, digital printing, flexo printing, and the like. Or, a printed thermoplastic film (e.g., PVC) or a wood veneer and the like can be laminated to a thermoplastic plank. A protective coating can then be placed on top of the printed design. Any type of protective coating or wear layer can be used, such as a polyurethane type coating with or without wear resistant particles in the coating. Thus, a plank would have a core, where the core has a top surface and bottom surface as well as opposing sides and a printed design directly on the top surface of the plank and optionally at least one protective coating on top of the printed design. The top surface of the plank as described earlier can have a textured surface as described above.

This type of plank can be made by extruding a material containing at least one polymeric material into the shape of the core and then printing a design directly on the top surface of the plank and then, optionally, applying at least one protective coating on top of the printed design and curing the protective coating. The protective coating can be applied by conventional techniques, such as with a curtain coater, direct roll coater, vacuum coater, differential roll coater, air knife coater, or spray apparatus.

In another embodiment of the present invention, a plank for surface coverings, such as flooring, has a core and an extruded layer on the top surface of the core, wherein the extruded layer includes at least one thermoplastic material with one or more pigmented compounds. The extruded layer on top of the extruded core can simulate various designs such as wood grain and the like.

The core layer can have a modulus or rigidity that is considered rigid or stiff. For instance, the polymer core layer can have a Young's modulus of at least 1 GPa, such as at least 1.1 GPa, at least 1.2 GPa, at least 1.3 GPa, or 1 GPa to 15 GPa or more.

The core layer used in the present invention can have a stiffness as measured by D1037-12 of at least 1 GPa, such as at least 1.1 GPa, at least 1.2 GPa, at least 1.3 GPa, or 1 GPa to 15 GPa or more.

The flooring plank of the present invention can have a modulus or rigidity that is considered rigid or stiff. For instance, the modular flooring plank can have a Young's modulus of at least 1 GPa, such as at least 1.1 GPa, at least 1.2 GPa, at least 1.3 GPa, or 1 GPa to 15 GPa or more.

The flooring plank of the present invention can have a stiffness as measured by D1037-12 of at least 1 GPa, such as at least 1.1 GPa, at least 1.2 GPa, at least 1.3 GPa, or 1 GPa to 15 GPa or more.

The flooring plank of the present invention can have a stiffness such that a 3-foot length of flooring plank will not bend around a one-inch diameter pipe without cracking or breaking.

For purposes of the present invention, the rigidity in the 'rigid' polymeric modular flooring plank is preferably defined by the flooring plank being compliant to ASTM F3261.

ASTM F3261 defines rigid as: rigid—when a flooring product has sufficient stiffness to bridge minor subfloor irregularities and sufficient stiffness that it takes significant effort to deflect the product when supported between two fixed supports (for example, resilient flooring with polymeric rigid core, laminate flooring, wood flooring, etc).

When a flooring plank is considered 'rigid' herein, the flooring plank would not pass LVT ASTM F1700 (a 1-inch mandrel bend test) without breaking/cracking (a rigid flooring will not pass that test).

A flooring plank of the present invention that is a polymeric flooring plank that is not rigid would be a flooring plank that is not fully compliant to ASTM F3261.

When a flooring plank is considered 'rigid' herein, the flooring plank can be tested following ASTM method D1037 which is a standard test method for evaluating properties of wood-base fiber and particle panel materials, but can be used in testing the planks of the present invention. The planks, as an option, can be considered rigid when having a stiffness of 800,000 kPa or greater following ASTM D1037. For instance, the stiffness can be 800,000 kPa to 1,200,00 kPa or higher for the planks of the present invention.

The polymeric flooring plank of the present invention can be a luxury vinyl tile (LVT). For purposes herein, a luxury vinyl tile (LVT) refers to a resilient plank floor covering including the polymeric base and a minor amount (<50 wt %) of inorganic filler (based on the total wt % of the LVT) in the polymer of the polymeric core layer. The LVT material can meet the requirements of ASTM F 1700, Class III (Printed Film Vinyl Tile). The LVT material can have the decorative layer on the polymeric base.

The at least one core layer can be a single layer construction or include a multiple core layer construction, such as including a first core layer containing CPVC, plasticizer, and filler, and a second core layer attached to a lower surface of the first core layer, and so forth. These different core layers can have the same or different compositions. These different core layers can be co-extruded or extruded or molded separately prior to being consolidated together into a unitary base portion by lamination or adhesion, or by other methods.

As an option, at least first and second core layers can be included in the core layer portion, where one core layer has a lower wt % CPVC, a lower wt % plasticizer, and/or lower wt % filler, than another core layer. These core layers can include other optional ingredients as mentioned herein. The multiple core layers can be bonded or otherwise adhered to each other through pressure and/or heat.

The polymeric flooring plank of the present invention can have a laminate construction, such as an LVT laminate structure.

The polymeric flooring plank of the present invention can comprise a first tongue on a first side and a first groove on the opposite second side, wherein the first tongue and first groove have complementary shape to each other to be interlockingly engageable with a corresponding groove or tongue on an adjacent floor plank. The other two sides of the plank can have a similar tongue/groove profile. The mechanical locking system can be visible with respect to a tongue (projections), also known as the "giving part," and a "receiving part," which is also known as a groove (recess). The tongues and grooves can be located parallel to each other on both pairs of sides or edges of the surface covering to achieve near-perfect or perfect alignment. The tongue/groove designs as set forth in U.S. Pat. Nos. 8,833,028; 4,426,820; 6,490,836; 7,658,048 can be utilized and these patents are incorporated in its entirety by reference herein.

The present invention also relates to a packaged flooring system that can comprise, consist of, consist essentially of, include, or have, a package holding a plurality of polymeric flooring planks of the present invention. The plurality of polymeric flooring planks can be stacked on top of one another and parallel to one another while in the package.

The present invention further relates to a method to make the flooring planks of the present invention.

The present planks can be formed using a variety of methods. For instance, the composite sheet that comprises the floor plank can be formed by individually pre-forming the base layer or layers and/or any print layer that contains the print design. The wear layer can be present as an overlay wear layer or can be formed afterwards. The wear layer can include a protective layer, strengthening layer, and the like. Each of the base layers can be individually formed by calendar rolling, extrusion or other techniques once the formulation for each of the base layers are prepared. Then, the layers that constitute the entire composite sheet or a part thereof can be placed on top of each other in a stack in their correct order and subjected to hot pressing using a hydraulic press to form a plank body that can be milled to form the tongue and groove edge profiles. In one example, the composite sheet of the plank is manufactured as multiple individual pressed sheets, which are consolidated into a unitary composite sheet forming the plank body. In one example, a sheet layup including one or more base layers, a print layer, and optionally a wear layer, are stacked in their correct order and subjected to hot pressing using a hydraulic press to form a sheet. For instance, the temperature can range, for example, from about 125° C. to about 135° C. or other temperatures above or below this range. The pressure can be, for example, from about 4 MPa to about 18 MPa or other pressures above or below this range. Generally, the time that the pressure can be applied, for example, is from about 30 seconds to about 2 minutes, such as from about 1 minute or any time above or below these ranges. The consolidation to form the sheet can be a large sheet that can be punched or cut up into desired final dimensions of the plank (or multiple planks). For instance, during this hot pressing, the overall sheets can be about 1 meter×1 meter or larger or smaller. Once the hot pressing to form the consolidated sheet is achieved, the sheet can be then annealed to remove stress and achieve dimensional stability. The annealing can occur in an oven or other heating device. The annealing can occur at a temperature of from about 125° C. to about 135° C. This annealing can be done on a conveyor belt, through an infrared oven or conventional air impinged oven, the speed can be any suitable speed depending upon the length of the oven and the temperature setting. For instance, the speed of the conveyor belt can be about 3 meters per minute to about 10 meters per minute, such as about 3.5 meters per minute to about 8 meters per minute. Afterwards, the sheet can be aged at ambient conditions, such as about 25° C., for various hours, such as about 1 day (about 24 hrs.), about 2 days (about 48 hrs.), about 3 days (about 72 hrs.), or more. Afterwards, the sheet can be cut or punched out to plank sizes. As an option, a top coat layer or protective layer, like a UV protective layer, optionally containing wear resistant particles, such as aluminum oxide or other wear resistant particles can be applied, such as by means of a spray coating operation, roller coating operation, or air knife coater or, curtain coater and the like. The cold pressing operation can use various pressures, such as from about 10 to about 100 kg or more, and for a time, such as about 1 hour to about 3 days, such as about 24 hours. Then, the sides of the resulting planks can be profiled by cutting (e.g., milling) to impart the desired tongue and groove profiles.

The method can be considered a two-step process, where the first step is extrusion and lamination and the second step is finishing. During the extrusion and lamination process, a blend or formulation is prepared to form the core layer. The components of the core layer as described earlier can be combined and mixed to form a homogeneous mixture. This mixture can then be heated to form a melt or the extruder can cause the melting. The mixture is then fed into an extruder to form the core layer. The core layer can have any dimension, such as but not limited to, 39" inches wide, and 5.4 mm thick and have a length of 48 inches. Then, for laminating, the one to three layers (intermediate layer, decorative layer, and/or wear layer) are laminated to the top of the core layer, such as through several unwind stations and calender rolls and nip points. After forming the laminate, the laminate can be cooled slowly under low stress and tension, before being cut into slabs or planks. The cut planks can have dimensions of 6 inches by 48 inches or 7 inches by 48 inches or other dimensions including dimensions that are within 5% or within 10% or within 50% or within 100% of any of one or more of the dimensions provided here.

In the second part of the process—finishing—a top coat, such as a UV cured protective urethane top coat is applied to the top of the laminate, such as on top of the wear layer. The top coat can be applied as a coating or as a film layer that is then heated or cured. The laminate is flipped over and an adhesive is coated or applied onto the bottom surface of the laminate such as a hotmelt pressure sensitive adhesive, e.g., a polyurethane glue. The adhesive can be roll coated onto the underside of the core layer. Then, an underlayer, such as a foam layer (e.g., a crosslinked polyethylene foam layer) can be attached to the adhesive applied beforehand. The laminate can then cut into vertical planks. As a further option, the cut planks can be processed to receive a tongue and groove on one or all four ends.

The present invention further relates to a method to control dimensional stability of a polymeric flooring plank. The method includes the step of adding at least one CPVC to a polymeric formulation that is then extruded to form a layer (e.g., core layer) of the polymeric flooring plank. The amounts of CPVC and details of the core layer and options as described herein apply equally here for this method.

The present invention further relates to a method to offset the negative effects caused by plasticizer or use of plasticized material (such as RW material) present or used in a formulation to make one or more layers of a polymeric flooring plank. The method includes the step of adding at least one CPVC to a polymeric formulation that is then extruded to form a layer (e.g., core layer) of the polymeric flooring plank. The amounts of CPVC, plasticizer and RW, and details of the core layer and options as described herein apply equally here for this method.

Unless otherwise specified, all material proportions described as a percent herein are in weight percent.

The present invention will be further clarified by the following examples which are intended to be only exemplary in nature.

EXAMPLES

Example 1

In a lab, a blend of a formulation totaling 4000 g (4 kg) was prepared as set forth in Table 1—this was the control formulation. All components were added to a 5-gallon Hinschel style lab mixer, and using frictional heat of the blades, the blend ramped up in temperature from ambient (~25 C) to about 115 C. The rpm speed of the mixer was about 3000 rpm. Once the blend reached about 115 C, the mixer was stopped, and the blend dropped into a bucket for cooling to ambient temperature. Once cooled, the sample was extruded to produce samples for testing. The extruder was run at 170 C+/−5 degrees, and the sample was extruded through a die. The sample was then cut to size for testing. Dynamic Mechanical Analysis (DMA) testing was run, in order to determine the glass transition temperature (Tg) of each formulation. Samples of each formulation were run on a DMA Q800 instrument using a Multi-Frequency Strain module with a temperature ramp method. The clamp used was a single cantilever, using rectangular samples with dimensions 35.7 mm×12 mm×5.13 mm. The frequency and strain were held constant at 1 Hz and 1%, respectively. The temperature range explored was 35 C to 150 C, with a ramp rate of 3 C/min.

The formulations of the present invention (as shown in Table 2, except for the 'Control') were formulated based on modifying the control formulation, such that CPVC replaced an amount of PVC resin, with the desired goal of basing the amount so as to increase Tg, and in turn positively impact dimensional stability. Knowing the intrinsic composition of the plasticized rework in terms of PVC resin, filler, and plasticizer content—changes were made to the formulation in order to maintain processing behavior in production. To that end, the additives besides the PVC resin in Table 1 were slightly adjusted (plus or minus no more than 5% to 10% of each PHR amount indicated) in view of the addition amount of CPVC and plasticized rework.

TABLE 1

| Raw Material Component | % | PHR |
| --- | --- | --- |
| PVC Resin (K62) | 23.309 | 100 |
| Acrylic Process Aid | 4.895 | 21 |
| Heat Stabilizer | 1.492 | 6.4 |
| Fatty Acid Ester | 0.611 | 2.62 |
| PE Wax | 0.787 | 3.375 |
| OPE Wax | 0.169 | 0.725 |
| Foaming Agent (AZO) | 0.204 | 0.875 |
| Colorant | 0.204 | 0.875 |
| Co-Stabilizer | 0.735 | 3.155 |
| Plasticized Rework | 38.459 | 165 |
| Calcium Carbonate | 29.136 | 125 |
| Total | 100.000 | 429.025 |

TABLE 2

| Formula Scenario | DOTP Plasticizer, % | CPVC % | Ratio (CPVC/PZ) | Tg, Celsius (Strain at 1%) | Dimensional Stability, % |
|---|---|---|---|---|---|
| Control - CC | 1.44% | 0% | 0.00 | 96.9 | 0.71% |
| CPVC -1 | 1.26% | 6.4% | 5.09 | 101.8 | 0.35% |
| CPVC - 1 -Higher CPVC | 1.26% | 12.8% | 10.17 | 108.5 | ND |
| CPVC - 2 | 1.58% | 11.1% | 7.00 | 103.6 | ND |
| CPVC - 2 - Higher CPVC | 1.58% | 16.7% | 10.54 | 108.47 | 0.02% |
| CPVC-3 | 2.05% | 16.4% | 7.98 | 104.75 | ND |

*ND = Not Determined

The present invention includes the following aspects/embodiments/features in any order and/or in any combination:

1. A rigid polymeric modular flooring plank comprising a) a core layer having a top surface and a bottom surface, b) an optional intermediate layer having a top surface and bottom surface and laminated to said top surface of said core layer, c) a decorative layer having a top surface and a bottom surface and laminated to said top surface of said intermediate layer if present or to said top surface of said core layer, and d) a wear layer laminated to said top surface of said decorative layer, wherein said core layer comprises at least one polyvinyl chloride (PVC) that comprises a chlorinated polyvinyl chloride (CPVC).

2. The rigid polymeric modular flooring plank of any preceding or following embodiment/feature/aspect, wherein said intermediate layer is present.

3. The rigid polymeric modular flooring plank of any preceding or following embodiment/feature/aspect, wherein said rigid polymeric modular flooring plank further comprising a top coat adhered on top of said wear layer and an underlayer adhered to said bottom surface of said core layer.

4. The rigid polymeric modular flooring plank of any preceding or following embodiment/feature/aspect, wherein said underlayer is a foam layer and said top coat is a urethane top coat.

3. The rigid polymeric modular flooring plank of any preceding or following embodiment/feature/aspect, wherein said core layer further comprises one or more of the following: at least one filler, at least one processing aid, at least one heat stabilizer, at least one fatty acid ester, at least one wax, at least one foaming or blowing agent, or at least one plasticized rework/scrap material.

3. The rigid polymeric modular flooring plank of any preceding or following embodiment/feature/aspect, wherein said core layer further comprises at least one plasticized rework/scrap material.

4. The rigid polymeric modular flooring plank of any preceding or following embodiment/feature/aspect, wherein said core layer further comprises at least one plasticized rework/scrap material, at least one polyvinyl chloride resin, and at least one filler.

5. The rigid polymeric modular flooring plank of any preceding or following embodiment/feature/aspect, wherein said core layer further comprises at least one plasticized rework/scrap material and at least one polyvinyl chloride resin, and the plasticized rework/scrap material (RW) and the CPVC are present in an amount so as to have a CPVC/RW weight ratio of at least 0.2.

6. The rigid polymeric modular flooring plank of any preceding or following embodiment/feature/aspect, wherein said CPVC/RW weight ratio is at least 0.3.

7. The rigid polymeric modular flooring plank of any preceding or following embodiment/feature/aspect, wherein said CPVC/RW weight ratio is from 0.2 to 1.

8. The rigid polymeric modular flooring plank of any preceding or following embodiment/feature/aspect, wherein said rigid polymeric modular flooring plank is ASTM F3261 compliant.

9. The rigid polymeric modular flooring plank of any preceding or following embodiment/feature/aspect, wherein said core layer and/or rigid polymeric modular flooring plank is ASTM F3261 compliant.

10. The rigid polymeric modular flooring plank of any preceding or following embodiment/feature/aspect, wherein said rigid polymeric modular flooring plank further comprises a top coat present on said top surface of said wear layer.

11. The rigid polymeric modular flooring plank of any preceding or following embodiment/feature/aspect, wherein said rigid polymeric modular flooring plank further comprises a foam layer present on said bottom surface of said core layer.

12. The rigid polymeric modular flooring plank of any preceding or following embodiment/feature/aspect, wherein said rigid polymeric modular flooring plank further comprises a top coat present on said top surface of said wear layer and a foam layer present on said bottom surface of said core layer.

13. A method to control dimensional stability of a polymeric flooring plank, said method comprising adding at least one chlorinated polyvinyl chloride to a polymeric formulation that is extruded to form a layer of said polymeric flooring plank.

14. The method of any preceding or following embodiment/feature/aspect, wherein said polymeric flooring plank comprises at least one polyvinyl chloride (PVC) and plasticizer.

15. The method of any preceding or following embodiment/feature/aspect, wherein said polymeric flooring plank comprises at least one polyvinyl chloride (PVC) and plasticized rework/scrap material (RW).

16. The rigid polymeric modular flooring plank of any preceding or following embodiment/feature/aspect, wherein said core layer further comprises at least one filler in an amount of from 0.1 wt % to 52 wt %, at least one processing aid in an amount of from 0.1 wt % to 10 wt %, at least one heat stabilizer in an amount of from 0.1 wt % to 3 wt %, at least one fatty acid ester in an amount of from 0.1 wt % to 3 wt %, at least one wax in an amount of from 0.1 wt % to 2 wt %, at least one foaming or blowing agent in an amount of from 0.1 wt % to 0.5 wt %, at least one stabilizer in an amount of from 0.1 wt % to 3 wt %, and at least one plasticized rework/scrap material in an amount of from 0.1 wt % to 60 wt %, and said CPVC in an amount of from 0.1 wt % to 40 wt % and said at least one polyvinyl chloride (PVC) further comprises at least one polyvinyl chloride resin that is different from said CPVC and present in an amount of from 0.1 wt % to 25 wt %, with all wt % based on total weight of the core layer.

The present invention can include any combination of these various aspects, features, or embodiments above and/or below as set forth in sentences and/or paragraphs. Any combination of disclosed features herein is considered part of the present invention and no limitation is intended with respect to combinable features.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A rigid polymeric modular flooring plank comprising
a) a core layer having a top surface and a bottom surface,
b) an optional intermediate layer having a top surface and bottom surface and laminated to said top surface of said core layer,
c) a decorative layer having a top surface and a bottom surface and laminated to said top surface of said intermediate layer if present or to said top surface of said core layer, and
d) a wear layer laminated to said top surface of said decorative layer,
wherein said core layer comprises at least one plasticized rework/scrap material comprising recycled or reclaimed plasticizer and at least one polyvinyl chloride (PVC) that comprises a chlorinated polyvinyl chloride (CPVC), the plasticized rework/scrap material (RW) and the CPVC are present in an amount so as to have a CPVC/RW weight ratio of at least 0.2, the CPVC is in an amount of from 25 wt % to 40 wt % based on total weight of the core layer, said at least one PVC further comprises at least one PVC that is not chlorinated and present in an amount of from 0.1 wt % to 20 wt % based on total weight of the core layer, and said rigid polymeric modular flooring plank or said core layer is ASTM F3261 compliant.

2. The rigid polymeric modular flooring plank of claim 1, wherein said intermediate layer is present.

3. The rigid polymeric modular flooring plank of claim 1, said rigid polymeric modular flooring plank further comprising a top coat adhered on top of said wear layer and an underlayer adhered to said bottom surface of said core layer.

4. The rigid polymeric modular flooring plank of claim 3, wherein said underlayer is a foam layer and said top coat is a urethane top coat.

5. The rigid polymeric modular flooring plank of claim 1, wherein said core layer further comprises one or more of the following: at least one filler, at least one processing aid, at least one heat stabilizer, at least one fatty acid ester, at least one wax, or at least one foaming or blowing agent.

6. The rigid polymeric modular flooring plank of claim 1, wherein said core layer further comprises at least one filler.

7. The rigid polymeric modular flooring plank of claim 1, wherein said CPVC/RW weight ratio is at least 0.3.

8. The rigid polymeric modular flooring plank of claim 1, wherein said CPVC/RW weight ratio is from 0.2 to 1.

9. The rigid polymeric modular flooring plank of claim 1, wherein said rigid polymeric modular flooring plank is ASTM F3261 compliant.

10. The rigid polymeric modular flooring plank of claim 1, wherein said rigid polymeric modular flooring plank further comprises a top coat present on said top surface of said wear layer.

11. The rigid polymeric modular flooring plank of claim 1, wherein said rigid polymeric modular flooring plank further comprises a foam layer present on said bottom surface of said core layer.

12. The rigid polymeric modular flooring plank of claim 1, wherein said rigid polymeric modular flooring plank further comprises a top coat present on said top surface of said wear layer and a foam layer present on said bottom surface of said core layer.

13. The rigid polymeric modular flooring plank of claim 1, wherein said core layer further comprises at least one filler in an amount of from 0.1 wt % to 52 wt %, at least one processing aid in an amount of from 0.1 wt % to 10 wt %, at least one heat stabilizer in an amount of from 0.1 wt % to 3 wt %, at least one fatty acid ester in an amount of from 0.1 wt % to 3 wt %, at least one wax in an amount of from 0.1 wt % to 2 wt %, at least one foaming or blowing agent in an amount of from 0.1 wt % to 0.5 wt %, and at least one co-stabilizer in an amount of from 0.1 wt % to 3 wt %, and said at least one plasticized rework/scrap material in an amount of from 0.1 wt % to 60 wt % with all wt % based on total weight of the core layer.

* * * * *